US006784945B2

United States Patent
Norsworthy et al.

(10) Patent No.: US 6,784,945 B2
(45) Date of Patent: Aug. 31, 2004

(54) SYSTEM AND METHOD FOR PROVIDING FAST ACQUIRE TIME TUNING OF MULTIPLE SIGNALS TO PRESENT MULTIPLE SIMULTANEOUS IMAGES

(75) Inventors: John P. Norsworthy, Lucas, TX (US); Stanley Vincent Birleson, West Tawakoni, TX (US); Douglas J. Bartek, Frisco, TX (US)

(73) Assignee: Microtune (Texas), L.P., Plano, TX (US)

(*) Notice: Subject to any disclaimer, the term of this patent is extended or adjusted under 35 U.S.C. 154(b) by 3 days.

(21) Appl. No.: 09/410,588

(22) Filed: Oct. 1, 1999

(65) Prior Publication Data

US 2003/0016304 A1 Jan. 23, 2003

(51) Int. Cl.[7] .............................. H04N 5/50; H04N 5/45; H04N 5/445

(52) U.S. Cl. ..................... 348/731; 348/565; 348/564

(58) Field of Search ................................ 348/565, 553, 348/563, 564, 569, 570, 725, 731, 732, 733, 735, 729; 334/1, 8, 11; 725/39, 41; 375/316, 324, 326, 344, 350; 455/782.3, 192.3, 181.11, 179.01, 77; H04N 5/445, 5/45, 5/44, 5/50

(56) References Cited

U.S. PATENT DOCUMENTS

| | | | |
|---|---|---|---|
| 4,581,643 A | 4/1986 | Carlson | |
| 4,726,072 A | 2/1988 | Yamashita et al. | |
| 4,729,028 A | 3/1988 | Micic et al. ................. | 358/183 |
| 4,742,566 A | 5/1988 | Nordholt et al. | |
| 4,748,684 A | * 5/1988 | Wright, Jr. .................. | 348/735 |
| 4,979,230 A | 12/1990 | Marz | |
| 5,038,404 A | 8/1991 | Marz | |
| 5,060,297 A | 10/1991 | Ma et al. | |
| 5,140,198 A | 8/1992 | Atherly et al. | |
| 5,173,777 A | 12/1992 | Dangschat ................... | 358/181 |
| 5,200,826 A | 4/1993 | Seong | |
| 5,311,318 A | 5/1994 | Dobrovolny | |
| 5,321,852 A | 6/1994 | Seong | |
| 5,390,346 A | 2/1995 | Marz | |
| RE34,895 E | * 4/1995 | Morotomi et al. .......... | 348/156 |
| 5,428,836 A | 6/1995 | Sanecki et al. | |
| 5,563,545 A | 10/1996 | Scheinberg | |
| 5,754,253 A | 5/1998 | Lee ............................. | 348/565 |
| 5,764,300 A | 6/1998 | Badger ....................... | 348/536 |
| 5,809,407 A | * 9/1998 | Kasperkovitz et al. ... | 455/184.1 |
| 5,841,483 A | 11/1998 | Shafer ........................ | 348/565 |
| 5,889,468 A | * 3/1999 | Banga ........................ | 340/628 |
| 5,900,868 A | 5/1999 | Duhault et al. ............. | 345/327 |
| 5,900,916 A | 5/1999 | Pauley ....................... | 348/565 |
| 5,994,955 A | 11/1999 | Birkeland | |
| 6,285,865 B1 | 9/2001 | Vorenkamp et al. | |
| 6,295,646 B1 | * 9/2001 | Goldschmidt Iki et al. . | 348/564 |
| 6,359,636 B1 | * 3/2002 | Schindler et al. ........... | 345/846 |
| 6,510,049 B2 | * 1/2003 | Rosen ........................ | 361/681 |

FOREIGN PATENT DOCUMENTS

| | | | |
|---|---|---|---|
| EP | 0912059 A2 | 4/1999 | ............ H04N/7/16 |
| WO | WO 97/34413 | 9/1997 | .......... H04N/4/445 |
| WO | WO 99/11061 | 3/1999 | ............ H04N/5/50 |

OTHER PUBLICATIONS

Meyer, Robert G. "A 1–GHz BiCMOS RF Front–End IC." IEEE Journal of Solid–State Circuits; vol. 29, No. 3, (Mar. 1994): 350–355.

(List continued on next page.)

Primary Examiner—Sherrie Hsia
(74) Attorney, Agent, or Firm—Fulbright & Jaworski LLP

(57) ABSTRACT

A multiple information decoding system and method are provided in which multiple information content is decoded sequentially and provided to a viewer such that the viewer perceives the information content as being simultaneously decoded. One embodiment of the system and method is in a video display system where RF channels are decoded by a single tuner for concurrent presentation to a display.

33 Claims, 6 Drawing Sheets

OTHER PUBLICATIONS

Kinget, Peter and Michiel Steyaert. "A 1 GHz CMOS Upconversion Mixer". IEEE Custom Integrated Circuits Conference. (1996) 197–200.

Crols, Jan, and Michel S. J. Steyaert. "A 1.5 GHz Highly Linear CMOS Downconversion Mixer." IEEE Journal of Solid–State Circuits. vol. 30 No. 7 (Jul. 1995). 736–742.

McGinn, Mike. "An Advanced I.F. Amplifier & AFT System Suitable for HDTV." IEEE Transactions on Consumer Electronics. vol. 36 No. 3 (Aug. 1990) 407–414.

Crols, Jan, and Miciel Steyaert. "An Analog Integrated Polyphase Filter for a High Performance Low–IF Receiver." 1995 Symposium on VLSI Circuits Digest Of Technical Papers. (1995) 87–88.

Anadigics, Inc. CATV/TV/Cable Modem Upconverter MMIC. Warren NJ (Apr. 22, 1998).

Anadigics Inc. VHF/UHF CATV/TV Tuner Dowconverter. Warren, NJ. (Apr. 22, 1998).

Anadigics, Inc. Anagics Technical Brief. Upconverter MMIC for CATV Preliminary. Warren, NJ. (Jan. 11, 1994).

Archer, John, and John Granlund, and Robert E. Mauzy. "A Broad–Band UHF Mixer Exhibiting High Image Rejection over a Multidecade Baseband Frequency Range." IEEE Journal of Solid–State Circuits, vol. SC–16 No. 4 (Aug. 1981) 385–392.

"Double–balanced mixer and oscillator" Phillips Semiconductors. (Nov. 7, 1997). 1–11.

Kuhn, William B. "Design of Monolithically Integrated Radio Transceivers" Kansas State University.

Scheinberg, N., et al. "A GaAs Up Converter Interated Circuit for a Double Conversion Cable TV "Set–Top" Tuner" International Conference on Consumer Electronics. (Jun. 1993). 108–109.

Maier, G.M., et al. "Double Conversion Tuner a Must for the Future?" IEEE Transaction on Consumer Electronics, vol. 38, No. 3. (Aug. 1992). 384–388.

Muller, J–E., et al. "A Double–Conversion Broad Band TV Tuner with GaAs ICs." GaAs IC Symposium Technical Digest. (1984). 97–98.

Nakatsuka, T., et al. , "Low Distortion and Low Noise Oscillator Mixer for CATV Converters." GaAs Symposium Technical Digest. (1988). 161–164.

Brady, Vernon, et al. "Development of a Monolithic FET Ka–Band Single Side Band UFConverter and Image Reject Downconverter." GaAs Symposium Technical Digest (Oct. 1989) 189–192.

Ablassmeier, Ulrich, et al. "GaAs FET Upconverter for TV Tuner" IEEE Transactions on Electron Devides, vol. ED–27, No. 6. (Jun. 1980). 1156–1159.

Ducourant, Thierry, et al. "A 3 Chip GaAs Double Conversion TV Tuner System with 70 db Image Rejection." Monolithic Circuits Symposium Digest of Papers. (1988). 87–90.

Torji, K., et al. "monolithic Integrated VHF TV Tuner." IEEE Transactions on Consumer Electronics, vol. CE–26. (May 1980). 180–189.

MC44302: Advanced Multi–Standard TV Video/Sound IF. Motorola, Inc. (Jun. 17, 1994).

Maier, Gerd M. "New System Approach to TV Tuner Design." IEEE Transactions on Consumer Electronics, vol. 36, No. 3. (Aug. 1990). 403–406.

* cited by examiner

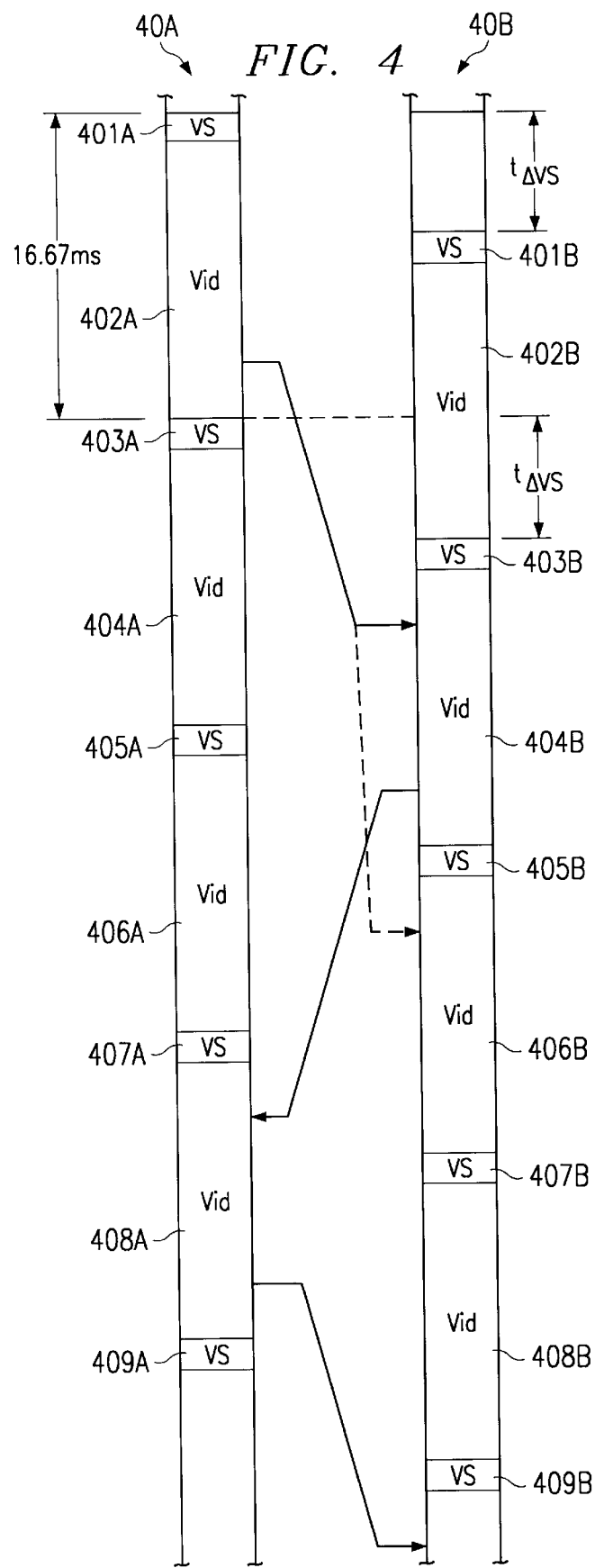

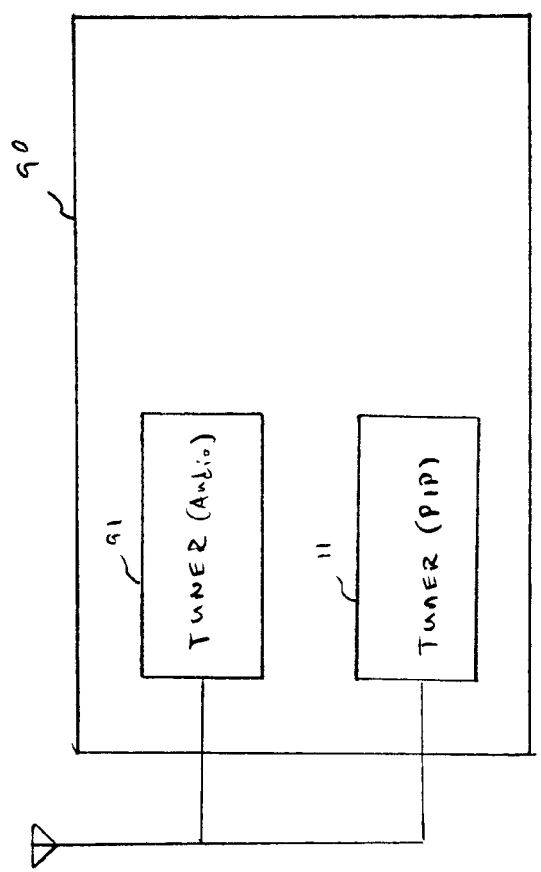

SYSTEM AND METHOD FOR PROVIDING FAST ACQUIRE TIME TUNING OF MULTIPLE SIGNALS TO PRESENT MULTIPLE SIMULTANEOUS IMAGES

RELATED APPLICATIONS

The present application is related to co-pending application Ser. No. 08/904,908, U.S. Pat. No. 6,177,964, entitled "BROADBAND INTEGRATED TELEVISION TUNER", which is hereby incorporated herein by reference.

TECHNICAL FIELD

This invention relates to tuner circuits and more particularly to such circuits where the channel acquire time is such that the tuner can sequentially present different channels to a viewer in a manner that the different channels are perceived as being simultaneously presented.

BACKGROUND

There are many situations where it is desired to display more than one video image (channel) at the same time. One such situation is the now popular picture-in-picture where a viewer may create on his/her display (such as a TV screen, PC or other device) a main picture and a window within the main picture to as to allow the viewer to simultaneously view a second picture.

When such picture-in-picture images are being viewed, the desired channels must be decoded from a multiplexed incoming signal such as an RF signal. The selection process for each channel requires the use of a tuner, a demodulator and a decoder all working in conjunction with a video processor. In the typical situation, each picture will have its own tuner, demodulator and decoder components. Thus, there is a cost added to any system where multiple pictures are required.

In addition to the cost, there is a size penalty that one must pay for multiple tuner systems. This size becomes important as the housing in which the television or other display device (such as a PC, cable modem, personal communication, or the like) becomes smaller.

One major problem that would be encountered if a single tuner system were to be shared between two or more pictures (each tuned to a different channel) is that the channel acquiring time of the tuner is so long that significant picture information is lost. Thus, either the main picture or the window picture (or both) are reduced in quality below an acceptable level.

SUMMARY OF THE INVENTION

These and other objects, features and technical advantages are achieved by a system and method which uses a tuner capable of acquiring a selected channel quickly enough so as not to lose enough signal to seriously degrade the video signal. It is recognized that one or two sync cycles could be skipped and the video signal, because of its high redundancy content (which is needed to refresh the screen), would not be seriously degraded. This situation is not true of audio information where degrading should occur if even a single sync cycle is missed. Taking advantage of the redundant video information then, in one preferred embodiment, a first tuner is used to decode a first, or main, signal (this would be the channel on which the user would be listening to audio if audio is desired) and a second tuner is used to provide two or more channels for presentation of the "window" images in association with the main channel. The tuner is designed to acquire selected channels within several sync cycles so that as the channels change, the image does not appear to be degraded.

This system is useful, for example, in a TV system in which a user watches (and listens) to one channel (the main channel) and several other channels are presented (without audio) concurrently on the screen. The system could also be used with a single tuner controlling several channels if the listener does not require audio, for example, in a PC application, or for a security monitoring. In such a system, audio, if desired, could be provided by a separate tuner. Audio could also be provided by the active video tuner if audio compression, or other techniques, is used to bridge the gaps that occur when the tuner is processing signals on the other channels. Note also that instead of images, the same tuner could be used to decode other types of information content from different channels and to present the different information contents to the user such that the user perceives the information as coming at the same time.

It is a technical advantage of my invention that a single tuner system and method is constructed to allow that tuner to sequentially decode several RF channels and to present the resulting images to a display such that the user sees the images simultaneously.

It is another technical advantage of the invention that a system is designed to allow for the sequential decoding of information signals from different channels and for the presentation of the decoded information to a user such that the information from the different channels is perceived as coming to the user simultaneously.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 4 shows a timing chart of two channels being decoded by the same tuner;

FIG. 9 shows a single tuner controlling several channels and a separate audio tuner according to an embodiment of the present invention.

DETAILED DESCRIPTION

Figure 5:
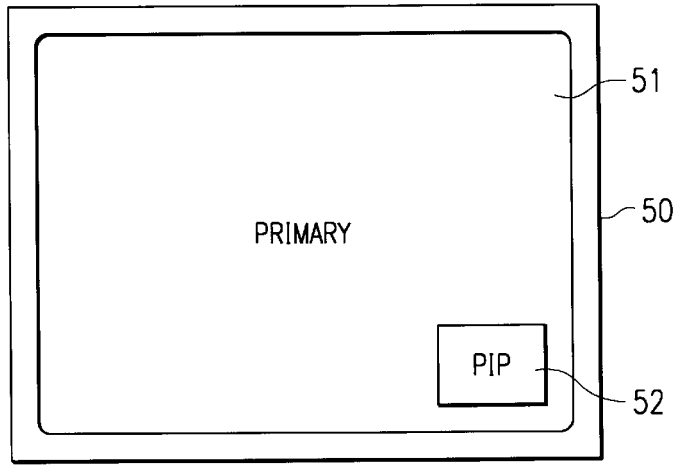
FIGS. 5 and 6 show prior art PIP systems.
Figure 6:
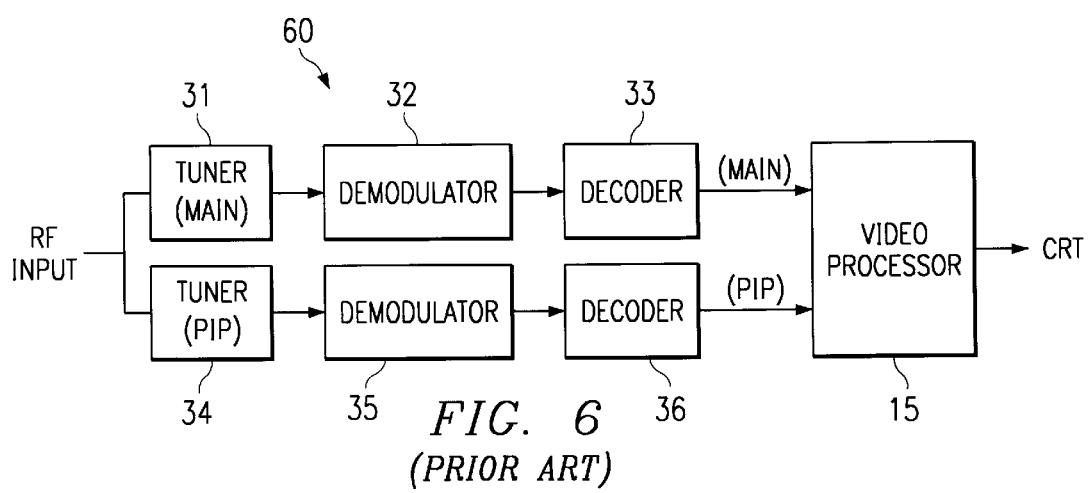

Before beginning a discussion of the concepts of my invention, it would be helpful to briefly review prior art systems in which a main display has contained within it an additional display section. This typically occurs in a television receiver where the viewer can watch a primary picture with audio and in a corner of the screen there would be displayed a different channel without audio. This is shown in FIG. 5 with display 50 having thereon main picture 51 and picture-in-picture (PIP) 52. FIG. 6 shows the prior art system for enabling the display of FIG. 5. In FIG. 6, main tuner 31 decodes the RF signal from the television antenna or cable and provides it to demodulator 32 which then provides a signal to decoder 33 for subsequent video processing by video processor 15 for display on CRT 50, as main picture 51, FIG. 5. PIP tuner 34 takes the same RF input, decodes a separate channel, presents that channel to demodulator 35, the output of which is presented to decoder 36, which in turn is presented to video processing 15 for presentation to display 50 as PIP picture 52 shown in FIG. 5. The user can select whatever channel the user desires from the RF input by tuning tuner 31 in the conventional manner and can select PIP picture by tuning tuner 34, again in the conventional manner. Audio is only available on the primary picture 51 but the user may interchange the two channels anytime the user wishes to do so.

Figure 1:
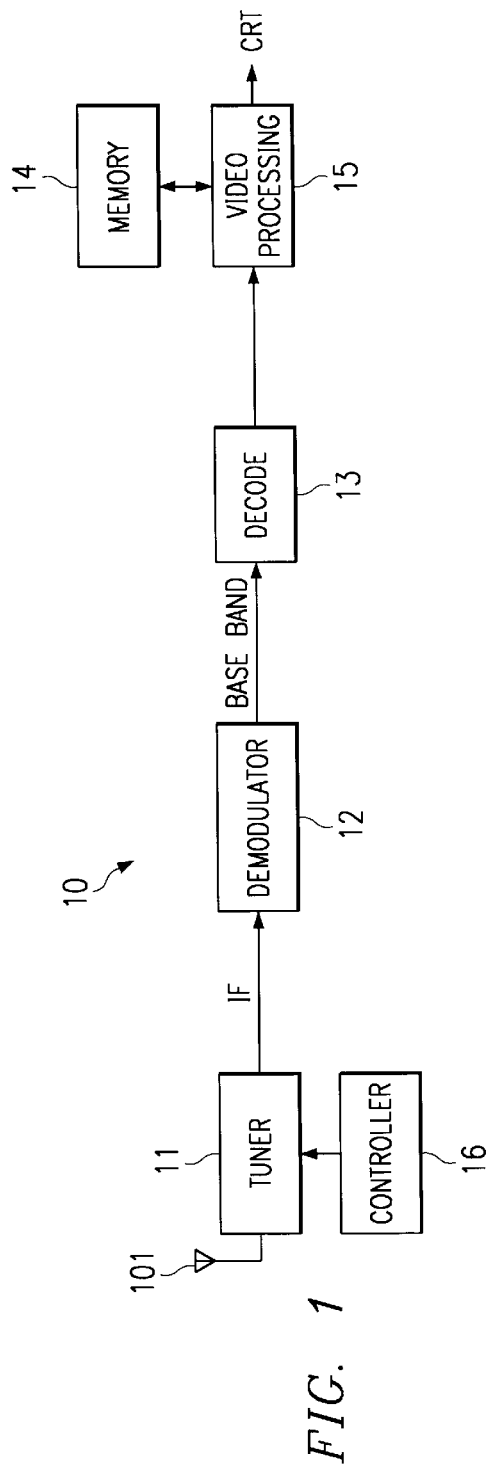
FIG. 1 shows a block diagram of the tuner used in my invention to provide multiple information signals.
Figure 2:
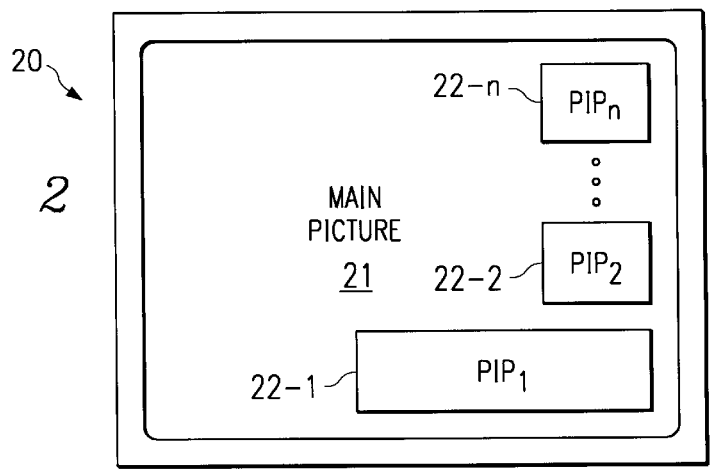
FIG. 2 shows a display having a main picture and a plurality of other displays.

Turning now to FIG. 1. The embodiment of the present invention is controlled by tuner 11 which receives RF signals from any RF source such as antenna 101, or from cable input or from any other input of signals to be decoded. Controller 16 determines which channels are to be decoded at any period of time and is capable of switching quickly between a plurality of different selected channels. The output of tuner 11 is provided to demodulator 12 which in turn is provided to decoder 13 and to video processor 15 as previously discussed. Memory 14 is used to hold video images as desired. The output of video processing goes to a CRT, which in this case would be display 20 of FIG. 2 displaying main picture 21 and picture-in-pictures 22-1 through 22-n. As will be discussed, the system of FIG. 1 can be used to provide multiple video signals to the display; however, because a single tuner is being used, the audio would be lost because of the interleaving effect as will be discussed in more detail hereinafter. In situations where it is desired, for example, in a television system to have the audio continuously available on the main channel, the circuitry system and method of FIG. 3 would be utilized where main tuner 31 would tune a single channel as set forth in the prior art system of FIG. 6, while tuner 11 would handle multiple PIP pictures for display as shown in FIG. 2. Note also in FIG. 2 that the PIP pictures need not all occlude the same areas and in fact could be different configurations on the screen and need not be on the screen at all times. This is all controlled by controller 16 in conjunction with memory 14.

Continuing in FIG. 1, tuner 11 accepts RF input from antenna 101. Antenna 101 could be a cable or an antenna, or other source of RF, which would be frequency division multiplexed into many channels. In a cable system there could be perhaps as many as 100 or more such channels. An antenna system would be off air television including the VHF band or the UHF band. The tuner would select one of those channels, filter out the rest, and translate that channel to an IF frequency. The IF frequency then would be demodulated, or down converted, by demodulator 12.

A channel is typically composed of video and audio. The audio could be either analog or digital, and the system could be a digital system as well where the base band would be a bit stream. In an analog system, such as we are discussing here, the demodulator takes the IF, down converts it to base band so as to produce two outputs, a base band composite video signal and a base band composite audio signal, composite meaning that it has, in the case of video, the luminance (black and white video signal) and the chrominance (color portion) combined together. The audio composite signal contains left channel and right channel information, and potentially other audio information such as the secondary acoustic program (SAP) or the professional channel. Decoder 13, in the case of an analog system, takes the base band video signal and separates the color portion from the luminous portion as well as extracts timing information so that it can be displayed in raster fashion. From the point of view of audio, decoder 13 takes the composite audio and either outputs a mono or stereo as desired.

Video processing 15 operates in conjunction with memory 14 to buffer the signals in order to display the information as a picture-in-picture. This requires, for example, reducing the picture or the video size by scaling so that it can be a subset of the screen. The buffer must combine the PIP signals with the primary picture signals since these are not coincident in time.

Memory 14 would be typically a few megabytes of dynamic memory DRAM and video processing 15 would be a digital signal processor that would be capable of doing the computations necessary to resize the video. Video processing 15 could be done by a microprocessor because the quantities of data are not very large. This microprocessor may even be controller 16 in FIG. 1. The digital video data rates are on the order of 13 mega samples per second.

Figure 8:
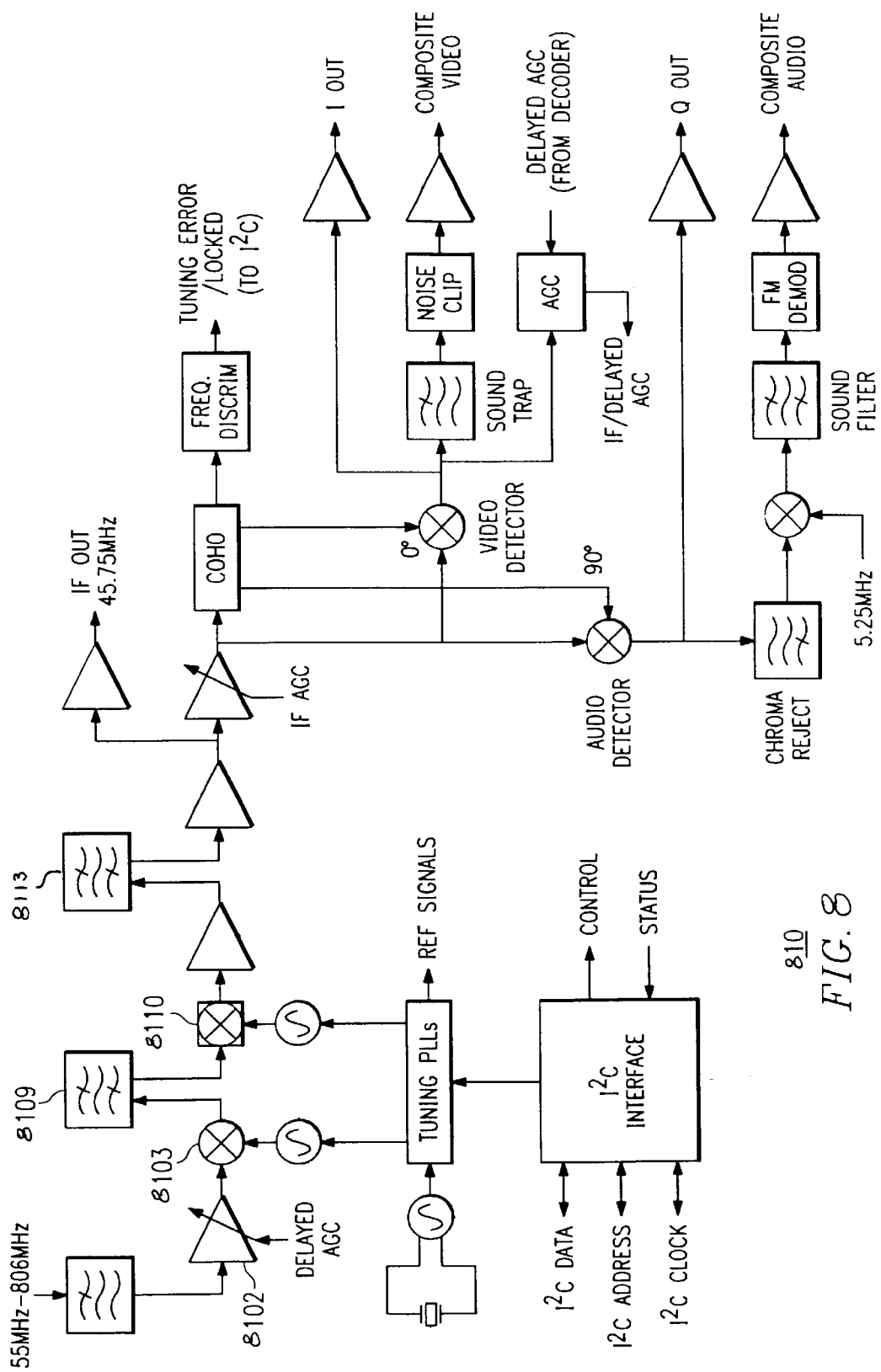
FIG. 8 shows a dual conversion tuner as may be used according to the present invention.

FIG. 4 shows two video streams 40A and 40B which come from a single tuner system. This tuner system could be, for example, the one in the aforementioned patent application entitled "BROADBAND INTEGRATED TELEVISION TUNER," shown in FIG. 8 of the present specification as dual conversion RF tuner 810 comprising low noise amplifier 8102, first mixer 8103, first IF filter 8109, second mixer 8110, and second IF filter 8113, or the tuner shown in U.S. Pat. No. 5,737,035, which is hereby incorporated by reference herein. Video streams 40A and 40B would be two separate channels on either the antenna or the cable as discussed above. The tuner must have the capability of switching very quickly from video stream 40A to video stream 40B (or to other streams if more than two signals are desired) in a minimum amount of time.

Figure 3:
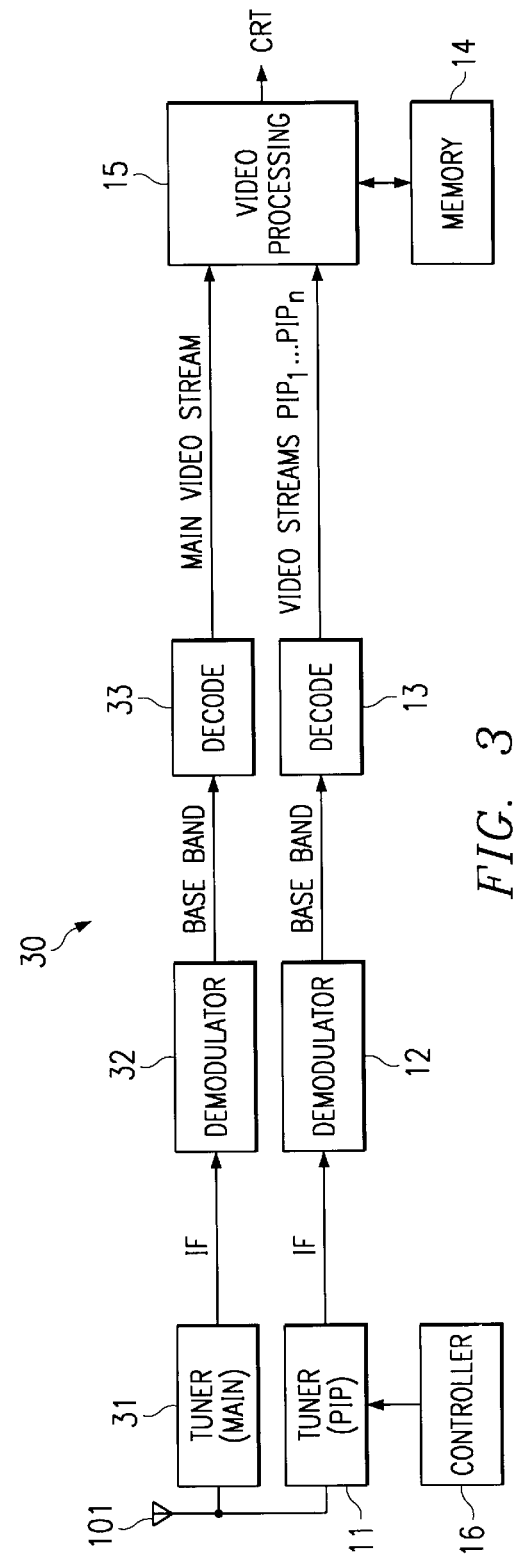
FIG. 3 shows one embodiment of my invention where a main tuner decodes the signal for the main display while a second tuner decodes multiple signals for the other displays viewed in conjunction with the main display.

FIG. 3 shows the preferred embodiment if sound is desired. Tuner 11 would alternate between multiple video streams A and B (40A and 40B in FIG. 4). Tuner 11 would decode and present one complete field (channel A) and then the channel would change and one complete field would be displayed (channel B). The tuner would change back to obtain the next complete field from stream A, switching back to obtain the next available field from stream B. This may require skipping some frames which would be acceptable to the viewer because this is a very small picture on the screen.

FIG. 9 shows another embodiment if sound is desired. In FIG. 9, the PIP system 90 uses a single tuner (tuner 11) controlling several channels. Audio is provided by a separate tuner (tuner 91).

Continuing, in FIG. 4 channels 40A and 40B are offset in time. Each channel (video stream) is shown greatly simplified. Vertical sync (VS), shown as 401A, 403A, 405A, 407A, and 409A for channel 40A and 401B, 403B, 405B, 407B, and 409B for channel 40B, is followed by a video sequence (Vid), shown as 402A, 404A, 406A, and 408A for channel 40A and 402B, 404B, 406B, and 408B for channel 40B, followed by another vertical sync, then another video sequence, then another vertical sync, etc. The video sequence could be a set of rasterized scan lines typical of a video signal.

The same is true for channel 40B, except that since we cannot guarantee that the signals are aligned, they may be offset as shown. The offset $t_{\Delta VS}$ is the time difference between the start of the V syncs. Thus, there is shown an offset of $t_{\Delta VS}$ between the start of VS 403A and VS 403B. If the tuner is selecting channel A, it can display a field 402A (which consists of 401A and 402A) then the tuner can switch to channel 40B. There is some delay and as long as that delay (which is the time of the channel change plus the time it takes to lock up the demodulators) is less than $t_{\Delta VS}$, then the system can display video signal 404B as the next image. Then the tuner can switch back to channel A so that it now displays 408A. Thus, the sequence we have shown here starts with 402A, goes to 404B, goes to 408A. Accordingly, there is displayed every third field.

If the channel switch time, let's call it TcS, is less than one field time, then the next field of the other stream could be displayed. This is not true only if this t VS is less than PcS+TcPL, where PcS is the time that it takes to change channels. The tuner channel acquire time of embodiments of the present invention is 5 milliseconds or less. Ideally, channel change time should be around one millisecond or less. In standard tuners it is anywhere from 50 to 150 milliseconds. The TcPL is the phase locking time of the demodulator and decode circuits which is fast because they are already frequency locked to the appropriate IF frequency. In the case of the demodulator and the color burst and the horizontal syncs of the TV decoders, they are also fast and will lock up rather quickly.

The channel acquire time will determine how many frames are skipped as well as how many simultaneous channels can be decoded before the user will detect a degradation of image. Of course, in situations where the data on each channel is slowly changing, the slower the acquire time need be.

While the discussion herein has been focused on video presentations to a viewer, this system can be used in any situation where RF multiplexed data must be removed sequentially and quickly from a source.

Note that the channel selection for the plurality of channels could come manually and remain for a period of time, or the channel selection for one or more of the plurality of channels, can be changing. This change could occur by programming or by signals carried on the transmission mediums. These transmission signals can be decoded from the information provided on the medium.

Figure 7:
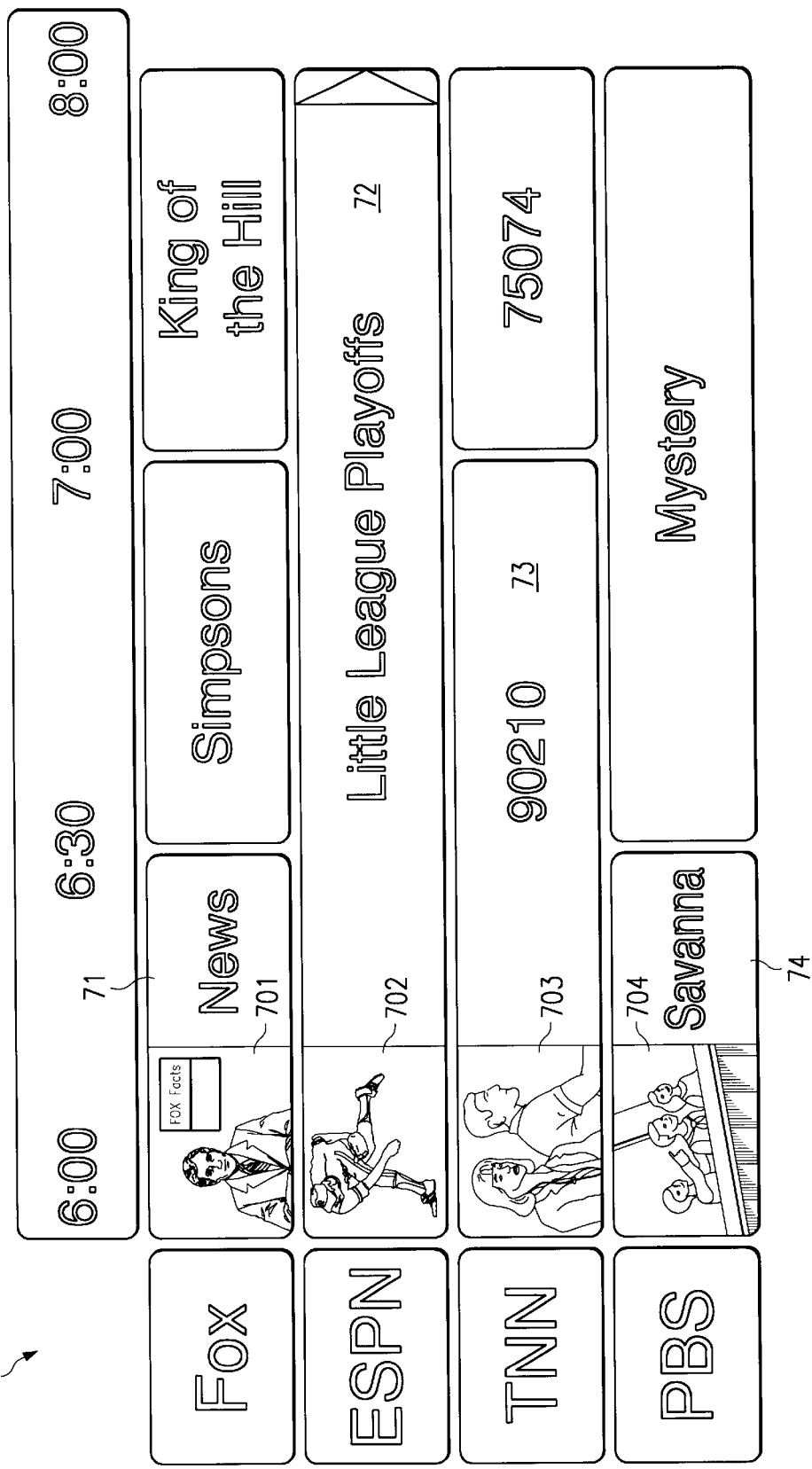
FIG. 7 shows an Electronic Program Guide having a thumbnail image associated with text blocks.

One application of the present invention is to provide an improved Electronic Program Guide (EPG). In a typical EPG, the guide consists of segments of text arranged as a list that describes the program on each channel for a given time. An improvement to that scheme would be to show a "thumbnail" video stream adjacent to each channel description. In such an enhanced EPG, it is desirable to have a highly reduced representation of a television, the thumbnail video stream, next to the listing of each television channel. Thus, several small PIPs are required to implement this feature if prior art PIP methods are used. Using the invention disclosed herein, the feature could be added with minimal cost by adding only one PIP tuner, demodulator and decoder, by rapidly switching between the multiple video streams and thereby sub-sampling them. The reduced frame rate of this sub-sampling would not be excessively detrimental to the viewer as they are merely thumbnail streams intended to give the viewer a general visual impression of what is on the channel. Motion would still be present in the thumbnail video streams, but with a minor amount of "jerkiness" as an artifact of the sub-sampling process. FIG. 7 is a visual representation of page layout 70 of such an EPG. Note that the informational displays 71, 72, 73 and 74 each have associated with them a decoded (perhaps at a reduced frame rate) RF signal, signals 701, 702, 703, and 704 respectively, pertaining to the RE that would be seen if the viewer tuned to a selected channel. In some situations, future time RF signals could be supplied that could be decoded only by the PIP tuner and not by the main tuner. These can be used for promotional situations.

In situations where the system is processing digital data streams, for example 8-VSB, (the digital modulation scheme now proposed for use in the United States), the demodulation process may have a latency of 50 ms or more. However, coupled with a fast tuner, as discussed above, the acquisition is minimal and should remain on the order of 50 ms, such that one could rapidly switch between channels with a switching time dominated by the demodulator's acquisition time.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for decoding a plurality of channels, said system including:
    a single video tuner, said tuner having a fast channel acquire time such that the tuner can interleave at least two channels to form two distinct signals which are continuously updated that a user perceives as being formed simultaneously, wherein said acquired time is 5 milliseconds or less.

2. The system of claim 1 wherein said channels are decoded from RF signals.

3. The system of claim 1 wherein said formed signals are video signals.

4. The system of claim 3 further including an audio tuner separate from said video tuner, and wherein said audio tuner decodes an audio signal associated with a particular channel of said at least two channels.

5. The system of claim 4 wherein said video tuner and said audio tuner are part of a display system having PIP capability.

6. The system of claim 1 wherein said tuner includes:
    a dual conversion RF tuner comprising:
        a low noise amplifier passing all channels in a received band;

a first mixer having a first input coupled to said low noise amplifier and a second input coupled to a first local oscillator signal, wherein said first mixer outputs a first IF signal;

a first IF filter coupled to said first mixer and providing coarse channel selection, wherein said first IF filter removes all channels outside a selected frequency band from said first IF signal;

a second mixer having a first input coupled to said first IF filter and a second input coupled to a second local oscillator signal; and a second IF filter coupled to said second mixer and providing fine channel selection.

7. The system of claim 1 wherein said video tuner is utilized in a PC application.

8. The system of claim 1 wherein said video tuner is utilized in a security monitoring system.

9. The system of claim 1 wherein said at least two channels provide video streams for display of an electronic program guide, wherein said program guide includes text corresponding to each said channel of said at least two channels displayed upon a same screen as said at least two channels, and wherein said at least two channels are displayed as moving pictures.

10. An RF decoding system comprising:
a first tuner for forming a first video image from received RF signals; and
a second tuner for forming a plurality of other video images, each of said other images occluding a separate portion of said first video image, wherein said second tuner has a channel acquire time faster than 5 milliseconds.

11. The system of claim 10 wherein said first image has audio associated therewith.

12. The system of claim 10 wherein said other images are perceived by a viewer as being simultaneously presented.

13. A method for decoding a plurality of channels, said method including the step of:
providing a single video tuner, said tuner having a fast channel acquire time, wherein said acquire time is 5 milliseconds or less;
operating the tuner to interleave at least two channels to form at least two distinct signals; and
providing, in sequential form, said at least two distinct signals which are continuously updated so that a user perceives them as being formed simultaneously.

14. The method of claim 13 wherein said channels are decoded from RF signals.

15. The method of claim 13 wherein said formed signals are video signals.

16. The method of claim 15 further including the steps of:
decoding, using an audio tuner, an audio signal associated with a particular channel of said at least two channels; and
displaying said at least two channels in conjunction with audibly presenting said audio signal.

17. The method of claim 16 wherein said video tuner and said audio tuner are part of a display system having PIP capability.

18. The method of claim 13 wherein said at least two channels provide video streams for display of an electronic program guide, including the step of:
displaying a program guide including text corresponding to each said channel of said at least two channels upon a same screen as said at least two channels, and wherein said at least two channels are displayed as moving pictures.

19. A method for decoding RF signals, said method comprising the steps:
forming a first video image from received RF signals, using a first tuner; and
forming a plurality of other video images using a second tuner, each of said other images occluding a separate portion of said first video image, wherein said second tuner has a channel acquire time faster than 5 milliseconds.

20. A method of claim 19 wherein said first image has audio associated therewith.

21. The method of claim 19 wherein said other images are perceived by a viewer as being simultaneously presented.

22. The method of decoding signals from a frequency division multiplexed source, said method comprising the steps of:
applying said source to a tuner circuit, wherein said tuner circuit has a channel acquire time less than 5 milliseconds;
alternating the channel selectivity of said tuner circuit to provide multiple decoded signals perceived by a user to be simultaneously provided;
presenting text data on a video display, said text data having information corresponding to a plurality of said multiple decoded signals; and
providing in association with such text data, video images from a plurality of said multiple decoded signals.

23. The method of claim 22 further including the step of:
forming a composite image from said provided multiple decoded signals.

24. The method of claim 22 wherein said method is used in a PIP system where there is a main image and a plurality of secondary images which each partially occlude the main image and wherein said decoded signals provide said plurality of secondary images.

25. The method of claim 24 further including the step of:
applying said source to a second tuner; and
adjusting the channel selection of said second tuner to produce said image.

26. The method of claim 25 wherein said adjusting step includes:
selection of audio for presentation with said main image.

27. A system for sequentially presenting data, said system comprising:
means for presenting multiplexed signals to a tuner so as to obtain data from selected channels of said multiplexed data;
means for selecting which of said channels is desired at any point in time; and
means for controlling said selecting means so as to alternate within 100 milliseconds between a plurality of said channels.

28. The system of claim 27 wherein an acquire time of said tuner is 5 milliseconds or less.

29. The system of claim 27 wherein said tuner includes:
a dual conversion RF tuner comprising:
a low noise amplifier passing all channels in a received band;
a first mixer having a first input coupled to said low noise amplifier and a second input coupled to a first local oscillator signal, wherein said first mixer outputs a first IF signal;
a first IF filter coupled to said first mixer and providing coarse channel selection, wherein said first IF filter removes all channels outside a selected frequency band from said first IF signal;

a second mixer having a first input coupled to said first IF filter and a second input coupled to a second local oscillator signal; and a second IF filter coupled to said second mixer and providing fine channel selection.

30. A method for presenting a video guide on a video display, said guide containing text data pertaining to program material available on a plurality of channels, said method comprising the steps of:

providing in association with each such text data, a video image of program material on an associated channel of said plurality of channels; and operating a tuner having a fast channel acquire time such that the tuner can interleave at least two channels to form at least two distinct signals that a user perceives as being formed simultaneously by providing, in sequential form, at least two channel selections wherein said acquire time is 5 milliseconds or less.

31. The method of claim 30 wherein said channels are decoded from RF signals.

32. The method of claim 30 further including the steps of:

decoding, using a second tuner, a particular channel while said fast channel acquire time tuner decodes said at least two selected channels; and displaying said two selected channels in conjunction with said second tuner decoded particular channel.

33. The method of claim 32 wherein said fast channel acquire time tuner and said second tuner are part of a display system having PIP capability.

* * * * *